United States Patent [19]

Kinrade

[11] 4,123,991
[45] Nov. 7, 1978

[54] STRUCTURES FOR HOUSING LIVESTOCK

[75] Inventor: Stephen S. Kinrade, Loughton, England

[73] Assignee: Frangos Brothers & Co. Ltd., London, England

[21] Appl. No.: 744,944

[22] Filed: Nov. 24, 1976

[30] Foreign Application Priority Data

Dec. 3, 1975 [GB] United Kingdom ............... 49638/75
May 21, 1976 [GB] United Kingdom ............... 21072/76

[51] Int. Cl.² .............................................. A01K 1/00
[52] U.S. Cl. ...................................... 119/10; 119/15; 119/18
[58] Field of Search .................................. 119/10–12, 119/9, 17–19, 15, 16, 22; 105/371

[56] References Cited

U.S. PATENT DOCUMENTS

| 382,843 | 5/1888 | Stiles | 119/9 |
|---|---|---|---|
| 3,020,083 | 2/1962 | Doan et al. | 119/9 |
| 3,159,139 | 12/1964 | Haggard et al. | 119/17 |
| 3,662,713 | 5/1972 | Sachs | 119/18 |
| 3,824,958 | 7/1974 | Parady, Jr. | 119/10 |
| 3,888,211 | 6/1975 | Allen | 119/18 |
| 3,919,978 | 11/1975 | Schaefer | 119/17 |
| 4,023,531 | 5/1977 | Thompson | 119/17 |

*Primary Examiner*—Jay N. Eskovitz
*Attorney, Agent, or Firm*—McCormick, Paulding & Huber

[57] ABSTRACT

A structure for transporting or temporarily holding live animals such as cattle or sheep is formed from two rows of modular units which include a livestock living or holding space, a feed supply and a base below the living space in communication with the living space for receiving sewage of livestock. A platform module rigidly joins the two rows and provides access for livestock and attendants to the units which have sides that are adapted to permit ingress and egress to and from the living space. A sewage removal duct is carried by the platform module and is in communication with each sewage space. Ventilation and water facilities may be carried by the platform module, and a modular feed store may be provided between adjacent carrier units in each row.

10 Claims, 11 Drawing Figures

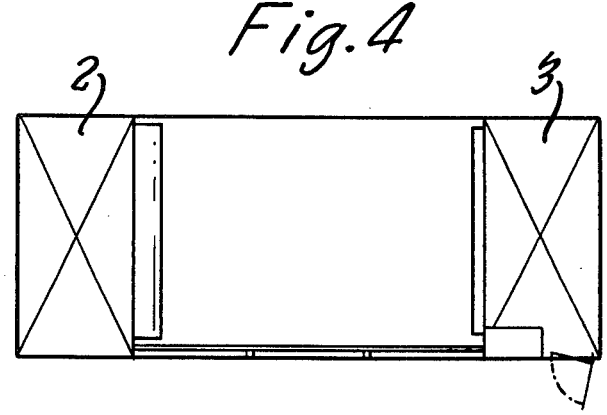
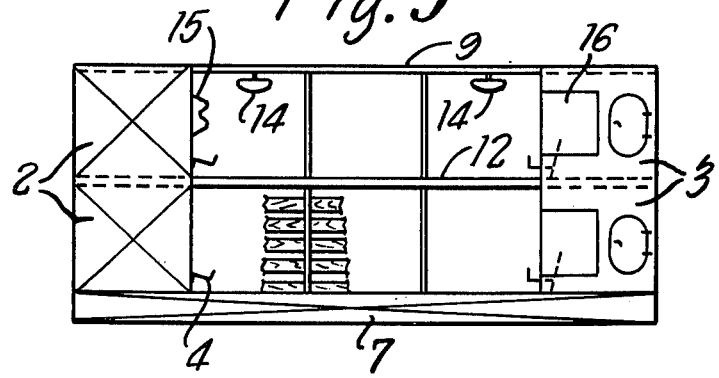
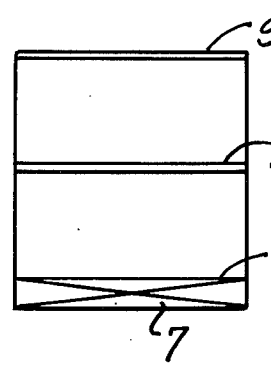

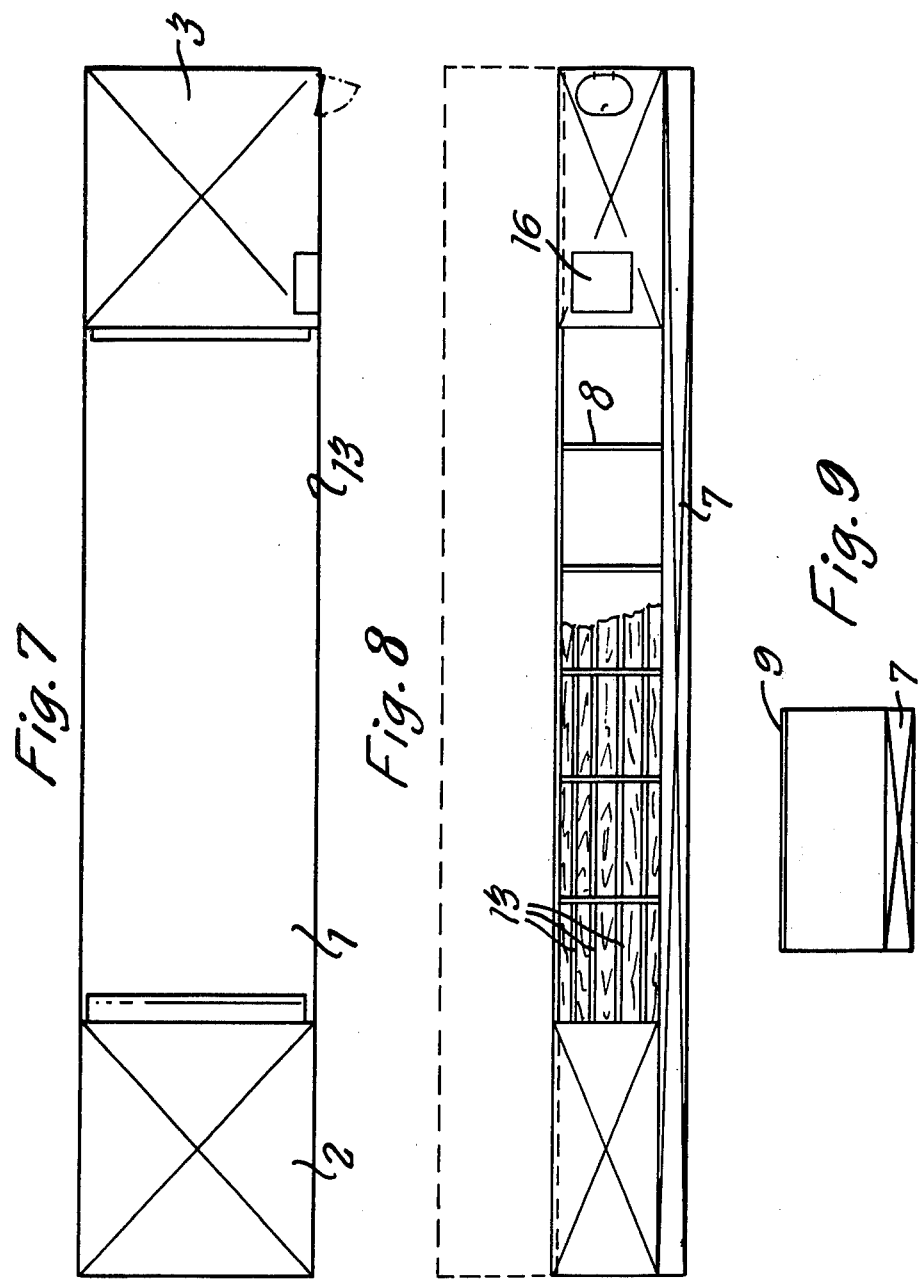

STRUCTURES FOR HOUSING LIVESTOCK

This invention relates to livestock carriers, that is containers for carrying cattle, sheep, swine or goats or the like, live from place to place by sea, land or in the air, and to structures for housing livestock over prolonged periods, which structures may be provided on land for storing the livestock, or in a preferred use, may be provided in, for example, a ship for transporting the livestock.

Several attempts have previously been made to convert ships for the transportation of live animals, whether in small or large numbers, from breeding countries to the consumer countries of the world, but the conversion of such ships in the manner previously contemplated has possessed certain disadvantages. For example, once the ships have been converted it is costly and difficult to re-convert the ship for use for its original purpose. This is particularly difficult where the transportation of live animals is a seasonal employment so that unless the ship is re-converted, it may be lying idle for some months of the year. Furthermore, while carrying livestock the vessel deteriorates faster than would normally be the case because of the contamination to and acid attack of the ship's fittings and structure. Still further, the time involved and the cost of converting the ship to take live animals is high and may take more than three months, and of course only certain types of ships are suitable for this conversion, i.e. those having the characteristics of large water supply capacity, good ventilation, good speed and adequate accommodation for the many extra animal attendants required over and above the normal ship's crew.

A livestock shipping container has been proposed in U.S. Pat. No. 3,530,830 which is believed to alleviate some of the aforementioned problems, but it is considered to be a disadvantage of the said container that attendants must be present to provide and disburse feed and bedding for the animals. Furthermore, it is proposed in that Patent that larger animals such as cattle should be provided with bedding material such as straw to absorb or cover the livestock droppings, and it is believed that this material must be regularly changed by the attendants if the animals are to avoid disease brought about by standing in their sewage.

It is therefore the main object of a first aspect of the present invention to provide a livestock carrier in the form of a module which may be used particularly, but not essentially, on board ship for the transportation of live animals and which alleviates many of the disadvantages inherent in converting a ship as previously practised, and inherent in the aforementioned shipping container.

According to the present invention there is provided a livestock carrier including a substantially rectangular main deck, and side members defining with the main deck a livestock space, a drinking water store and a feed store automatically supplying respective outlets in the livestock space, a base below the main deck defining therewith a sewage space with which the livestock space is adapted to be in continuous communication, a roof supported over the main deck and side members, and at least one side of the carrier being provided with means permitting ingress to and egress from the livestock space for the livestock.

The invention also includes a livestock carrier as described in the immediately preceding paragraph in which there is provided a removable deck between the main deck and the roof which is adapted in use to divide the livestock space into two superposed sections, and preferably the drinking water store and feed store have respective outlets for each said section.

It is a further object of the invention to be able to store or transport livestock for even longer periods than has hitherto been possible with less attention from attendants and with less permanent or semi-permanent attention to the storage or transport means.

According to this further aspect of the present invention there is provided a structure for housing livestock comprising a livestock carrying module having a space for livestock, a sewage space being defined below the floor of said livestock carrying module and with which the livestock space is adapted to communicate, an access module adjacent to the livestock carrying module to provide access thereto and means permitting ingress to and egress from the livestock carrying module by way of the adjacent access module, which latter carries services for the livestock carrying module to provide for the removal of sewage from the sewage space.

The structure of this further aspect of the present invention may provide a basic living area for the livestock in which food and water may be supplied from a central reservoir by attendants, or more conveniently the livestock carrying module may incorporate a feed store which may be located, for example, at one end thereof. Alternatively, the structure may include a sustenance module generally comprising a feed store which may contain feed for livestock in one or more livestock carrying modules. Conveniently, where the structure comprises two livestock carrying modules located substantially end to end to each other, the sustenance module may be located between the two to provide feed to each. The sustenance module may supply feed automatically to the or each associated livestock carrying module, but conveniently, attendants supply feed from the sustenance module to a trough or other outlet in each livestock carrying module. The trough may itself form part of a storage arrangement in the livestock carrying module which supplies the trough automatically by, for example, gravity feed.

The sustenance module may further comprise a water store or tank from which drinking water may be transferred to a water outlet in the or each livestock carrying module. The water tank may be replenished by means of a ducted drinking water supply service carried by the access module or modules which service may communicate with a reservoir, for example, in the case of a ship, the ship's tanks. In a preferred embodiment, a drinking water supply service is carried by the access module or modules supplying water direct to the outlet in the livestock carrying module or modules, preferably by way of an automatic valve.

In open space locations, natural ventilation into the livestock carrying module of the structure may be sufficient, since air should be able to enter the livestock space by way of at least one wall of each such module. In enclosed atmospheres such as the hold of a ship, forced ventilation is foreseen, and a ducted ventilation service may be carried by the or each access module to supply air to an outlet in the duct for a respective livestock carrying module. Where forced ventilation is provided, the or each access module will generally also carry a force extraction service connected to suction means for drawing foul air from an adjacent livestock carrying module.

The structure will require means for moving air through the forced ventilation service, and for pumping the sewage from the sewage space, and such means may be provided by the standard equipment provided at the location of the structure. For example, if the structure is located on a farm area or in a ship, there will generally be provided pumping means there which may be utilised for the structure. Preferably, however, the structure will include one or more pumping modules which may be connected to respective services in the or each access modules, and which are suitable for evacuating sewage from the sewage space, for extracting exhaust from the livestock carrying modules, and, if displacement due to the extraction of exhaust is not sufficient, for supplying air in the ventilation service. Where a drinking water supply service is provided, means will also be required for pumping drinking water from main water storage tanks into either the water store or direct into the water outlet in the livestock space.

In a preferred embodiment the structure for housing livestock will comprise a plurality of livestock carrying modules located in an arrangement comprising two spaced, opposed, and longitudinally extending rows, in which opposed livestock carrying modules are rigidly joined by an access module, and longitudinally adjacent access modules are rigidly joined to provide a continuous duct for the or each service. Generally the livestock carrying modules will be sufficiently strong to support at least one other such arrangement in overlying relationship.

In order more particularly to describe the various aspects of the present invention, reference will now be made to the accompanying drawings which show three basic types of livestock carrier, and an embodiment of a structure for housing livestock.

In the drawings:

FIG. 4 is a plan view of a further livestock carrier in accordance with the invention, the carrier having two storys;

FIG. 5 is a side view of the carrier of FIG. 4;

FIG. 6 is an end view of the carrier of FIG. 4;

FIG. 7 is a plan view of a larger livestock carrier constructed in accordance with the invention;

FIG. 8 is a side view of the carrier of FIG. 7;

FIG. 9 is an end view of the carrier of FIG. 7;

Figure 1:
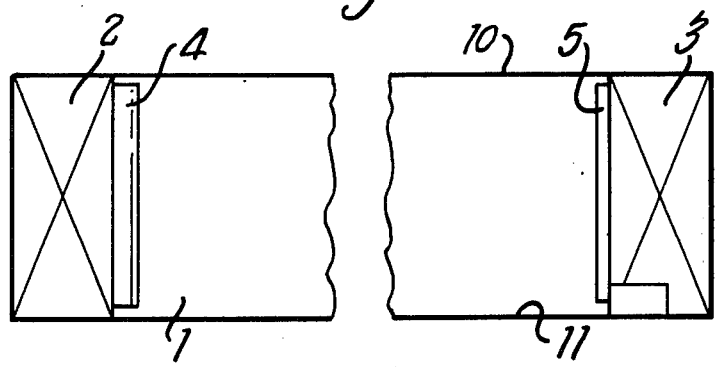
FIG. 1 is a plan view of a single story livestock carrier in accordance with a first aspect of the invention.
Figure 2:
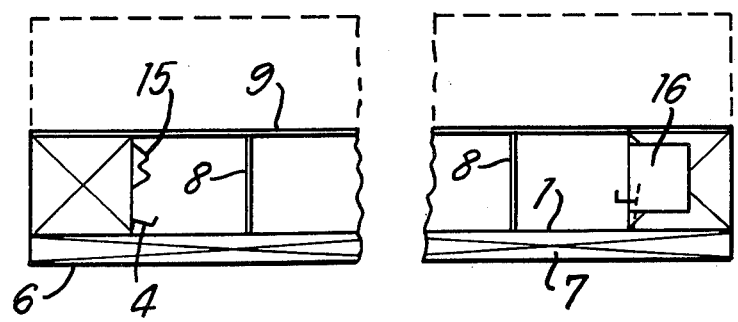
FIG. 2 is a side view of the carrier of FIG. 1.
Figure 3:
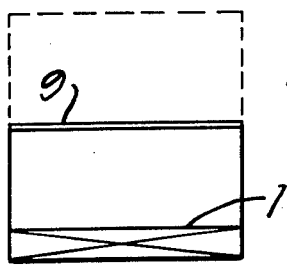
FIG. 3 is an end view of the carrier of FIG. 1.

Referring first to FIGS. 1 to 3, the livestock carrier comprises a main deck 1 which is substantially rectangular in plan view having at one end thereof a water store 2 and at the opposite end thereof a feed store 3. The main deck 1, water store 2, feed store 3, a roof 9 and rear and front walls 10 and 11 define together a livestock space. The water store 2 carries a drinking trough 4 for use by animals within the livestock space, and the feed store 3 carries a feed trough 5 also having access from the livestock space. Below the main deck 1 is a base 6 defining between itself and the main deck 1 a substantially enclosed sewage space 7, the main deck 1 being designed in such a way that excrement from the animals thereon will find its way to the sewage space 7 such that it is continuously self-draining. The main deck may, for example, be formed of an open mesh grill sufficiently strong to support the livestock, or it may be canted or have drains canted towards an opening into the sewage space 7.

Stanchions 8 support the roof 9 and should be sufficiently sturdy to enable one or more similar livestock carriers to be carried in superposed relationship thereby. The rectangular carrier may have solid walls as, for example, the solid rear wall 10, or an open network fence, comprising, for example, rails which may be provided along one or more sides, such as the front wall 11. A doorway or gate will be provided, generally in the front wall 11, through which animals may enter or leave the carrier. The entire structure is formed as a modular unit so that it may, for example, be lifted by crane or hoist on to or into a ship, fixed in place and be used for the transportation of livestock.

In FIGS. 4 to 6, a modified form of livestock carrier is shown, although like parts in this embodiment have been given like reference to those of the previously described embodiment. The difference here is that a removable deck 12 is situated approximately midway between the main deck 1 and the roof 9 so as to define two superposed sections of the livestock space, each with its own water store and feed store and respective outlets, although only one water store and one feed store need be provided, assuming that there are outlets in both sections. One of the purposes of providing a removable deck is to enable the carrier to be versatile in the type of animal transported, for example, with the removable deck in position animals such as sheep may be transported on both levels, whereas with the removable deck 12 removed animals such as cattle may be transported. When the removable deck 12 is not in use it may conveniently be stored either below the roof 9 of the carrier or on the main deck 1. The removable deck 12 will also normally be such that it is selfdraining into the sewage space 7. Separate doors will preferably be provided for each section of such a livestock carrying module.

In the embodiment illustrated in FIGS. 7 to 9, a longer carrier is shown, the carriers preferably being built to standard international sizes, and again similar parts to the embodiment of FIGS. 1 to 3 have been given similar reference characters. The front of the carrier is provided with rails 13, at least some of which may be removable or openable to provide access to and from the livestock space.

Each of the embodiments above described includes automatic means for filling the water and feed troughs direct from the respective stores. The water trough may be filled by, for example, an automatic valve which opens when the level in the trough drops to a predetermined level, and the feed trough may be supplied by, for example, a gravity feed system.

Each of the carriers may include electric lighting, as for example, at 14 in FIG. 5, and the carriers of FIGS. 1 to 3 and 4 to 6 are shown with electronic insect control arrangements at 15. Both the lighting and insect control may be supplied from a control switchboard in a locker 16, the switchboard preferably comprising input sockets for a variety of voltage supplies. The locker 16 is set into the feed store and is accessible from the exterior of the respective carrier.

Figure 10:
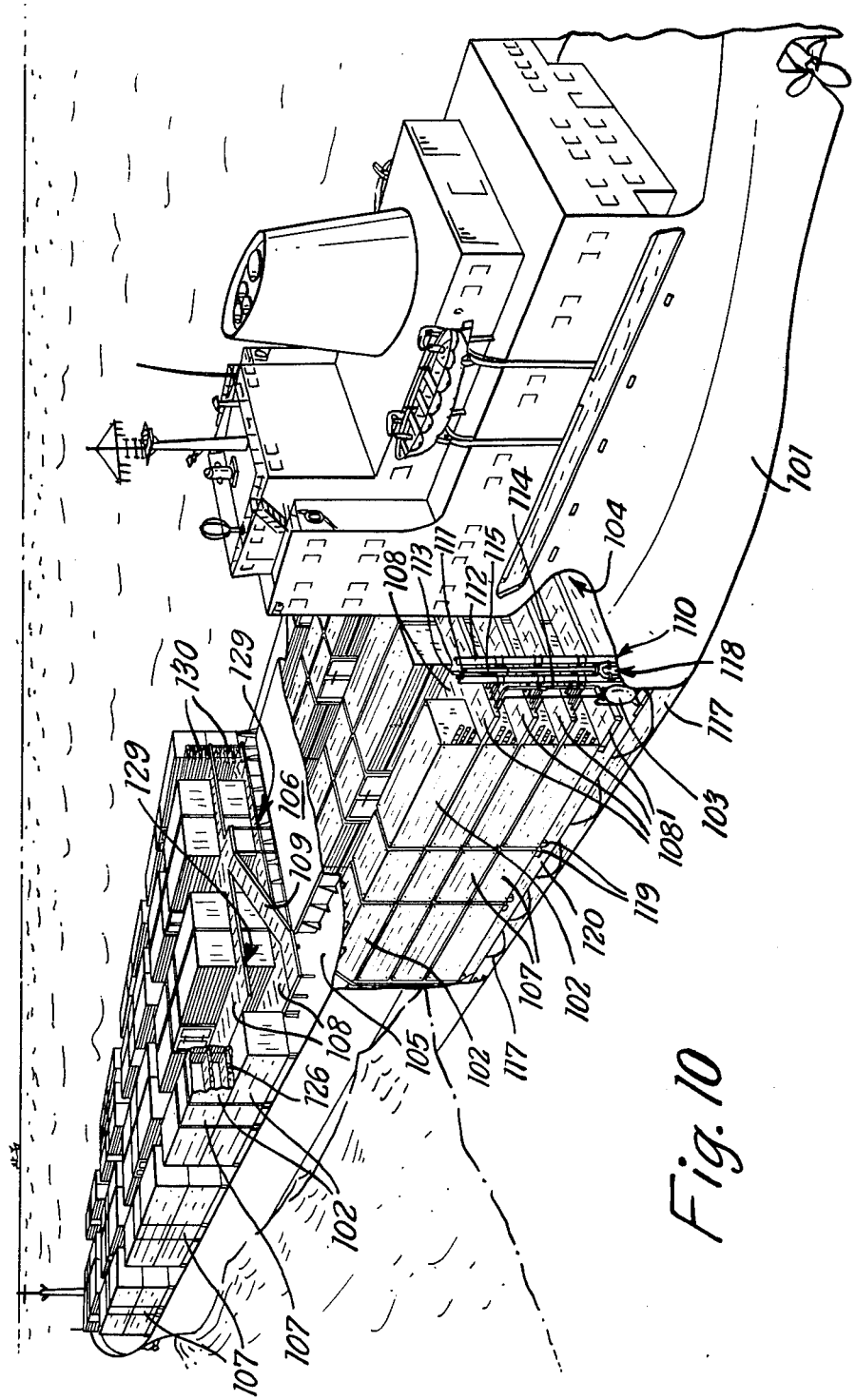
FIG. 10 shows a structure for housing livestock in accordance with a second aspect of the present invention, located on board a ship.

Referring now to FIG. 10, a ship 101 has been adapted, with minimal permanent conversion, to carry the structure for housing livestock, of the further aspect of the present invention, the structure comprising a plurality of elongate livestock carrying modules 102 for housing, for example, cattle, swine, sheep or goats, and associated access modules 108. The structure is assembled in a hold 104 of the ship as well as on a foredeck 105. Each of the modules should preferably be of a standard size, and as such, should be able to be lifted into and out of the hold 104 through a hatch 106 by means of, for example, a crane or hoist.

Each livestock carrying module 102 may have a feed store and water store formed integrally therewith as described with reference to the livestock carriers of FIGS. 1 to 9. Preferably, however, and as shown, they comprise primarily a livestock space and there are also provided sustenance modules 107, comprising a closed feed store with an access door, and one of which is located between two adjacent livestock carrying modules 102 in a row to provide feed to each. Feed may be transferred from the sustenance module 107 to an adjacent livestock carrying module 102 by automatic means, such as a gravity feed system, or it may be done manually by an attendant, filling a trough or a smaller store for a gravity fed trough in the livestock space. The sustenance modules illustrated require attendants to retrieve stored feed therefrom, by way of the access door, for supply to the livestock.

The livestock carrying modules 102, and associated sustenance modules 107, are shown stacked two, three or four high, and on a level with each main deck 126, between adjacent rows of such modules, access modules 108 are provided to enable access to the livestock carrying modules 102 for livestock and to the sustenance modules 107 and livestock carrying modules 102 for the attendants. Access modules may also be provided at the end of each row of livestock carrying modules 102, and the open side 129 of such access modules should be supported and suitable fencing 130 may be provided to alleviate any danger to the livestock and attendants. Ramp means, as at 109 on the foredeck, are provided to enable access from one level of modules to the next.

The access modules 108 comprise platforms which carry services for the livestock carrying modules 102. The services may be supplied to the access modules through pipework which is fitted temporarily or permanently in the ship 101, as shown generally at 110. The services shown supplied to the access modules 108 are air ventilation supply and exhaust pipes 111 and 112 respectively, a sea water mains pipe 113, a fresh water supply pipe 114, and a sewage extractor pipe 115, each of which mates with complementary services in adjacent end access modules 108' on each level.

The air ventilation supply pipe 111 is provided with air from a first fan module (not shown) which may be fitted to an upper deck of the ship 101 and which drives fresh air into end access modules 108' an thence into adjacent access modules 108 and into the livestock carrying modules 102. Foul air may be forced from the livestock carrying modules 102 by displacement, but preferably it is drawn through an extraction service in the access modules 108 and into the exhaust pipe 112 by means of a further fan module (not shown) which may also be fitted on an upper deck of the ship and which extracts the foul air to atmosphere.

The drinking water supply pipe 114 is required to supply water to drinking troughs (not shown) in the livestock modules 102. In the embodiment shown, drinking water is stored in at least some of the ship's ballast water tanks 117 and is drawn therefrom into the supply pipe 114 by a water pumping module 103. The level of water in a trough in each livestock carrying module 102 may be controlled, for example, by means of a gravity feed system or automatic valve.

The sea water mains pipe 113 provides sea water which may be used for fire control of the structure, for washing and flushing of the decks of the livestock carrying modules 102 and access modules 108, and as a carrier for the sewage passing through the sewage extractor pipe 115 from each livestock carrying module.

A sewage ejector module 118, comprising a pump or other suction means, is provided to evacuate sewage from the livestock carrying module 102 into a main tank or, where allowed, into the sea.

Conveniently, in the event of a power failure in the ventilation system, the structure, the structure may be ventilated by connecting the sewage ejector module or modules 118 to the exhaust ventilation system. The sewage ejector module 118 is driven by the ship's fire water pump on an independent supply and in the event of such a crisis, may be used to evacuate foul air from the structure. Fresh air should be drawn in through the supply system by displacement.

Figure 11:
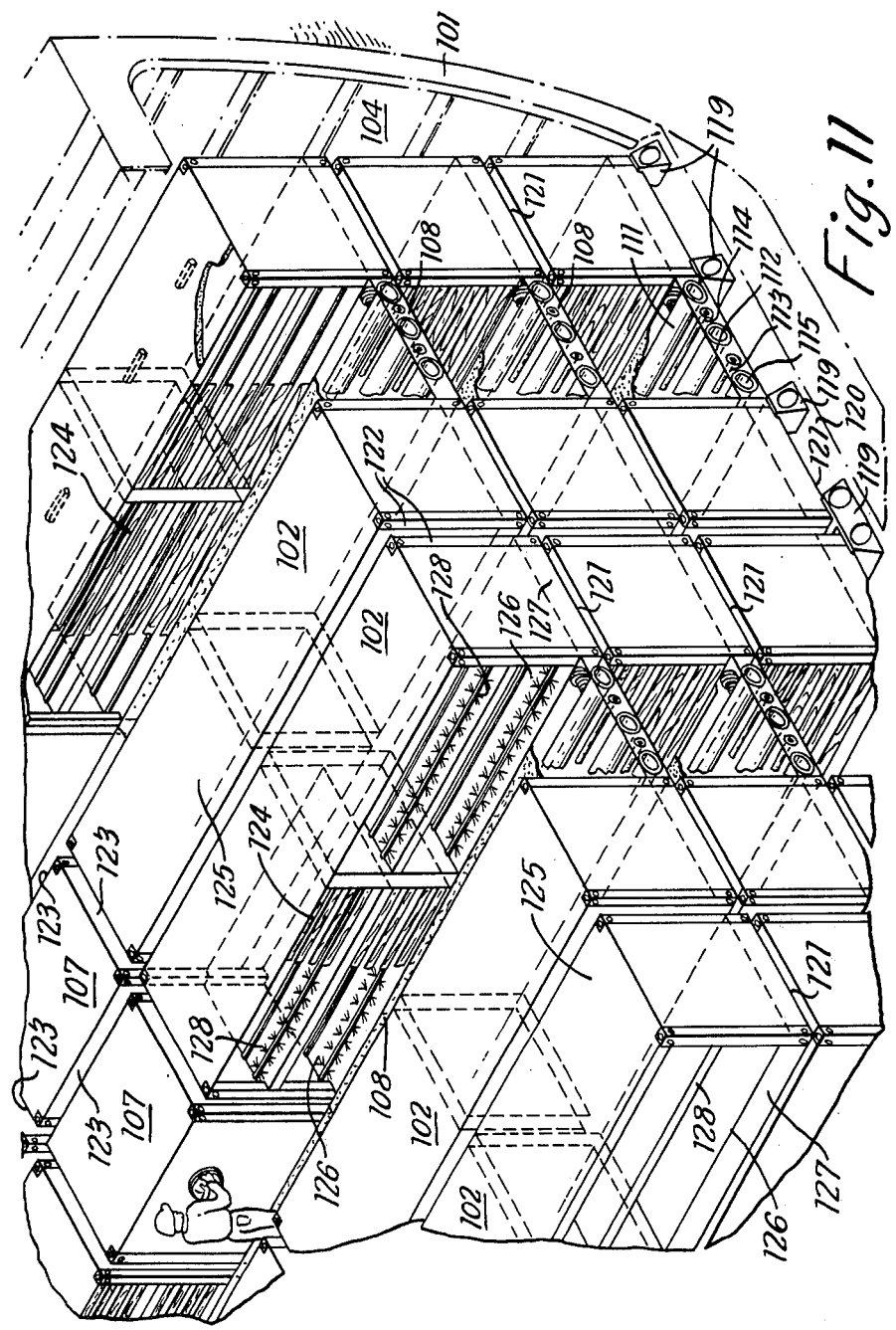
FIG. 11 shows part of a similar structure to that illustrated in FIG. 10, in greater detail.

FIG. 11 shows part of a typical structure in greater detail, wherein the modules are shown located in the hold by supports 119, one at each corner of the base of each of the lowermost level of livestock carrying and sustenance modules. The supports 110 should be immovably fixed, as by bolting or welding, to the floor 120 of the hold, or as shown in FIG. 10, to the deck of the ship 105. The respective module, whether livestock carrying module 102 or sustenance module 107 should be fixed to the supports 119, as by bolting, to alleviate movement of the structure relative to the ship. The access modules 108 are bolted to the adjacent two livestock carrying modules 102 or sustenance modules 107, and superposed modules 102 or 107 should be bolted to the respective module below.

Each livestock carrying module 102 comprises a base 121, at least four rigid uprights 122 extending perpendicularly upwardly from the base 121, four walls 123 extending between the uprights 122, at least one of which comprises removable fencing (rails) as at 124, which may provide ingress to and egress from the module, and, conveniently, an insulated roof 125. The four uprights 122 of each module 102 should be sufficiently strong to bear the weight of up to six full modules which may be located on it in superposed relationship. The module 102 further includes a main deck 126 which is spaced from the base 121 and between which and the base 121, is provided a sewage space 127 which communicates with the sewage extractor service in an adjacent access module 108. Structurally the sustenance modules 107 as shown in FIG. 11 are similar to the livestock carrying modules 102 in that they comprise four uprights extending from a closed floor structure and walls extending between the uprights. A roof structure tops the uprights of each module 107.

The main deck 126 of the livestock carrying module 102 should be self-draining into the sewage space 127, and may, for example, be provided with a grating, or it may have special animal footlocks suitably ported and shuttered to allow such draining of sewage.

Where smaller livestock, such as sheep, swine or goats, are being conveyed in the structure, some or each of the livestock carrying modules 102 may have a removable partitioning floor 128 which may be located between the floor 126 and insulated roof 125 to provide two superposed sections of the livestock space in each module 102 substantially as described with reference to FIGS. 4 to 6. The module 102 should then be provided with means for conveying sewage from the partitioning floor 128 to the sewage space 127, and ramp means will be provided for access for the livestock from the access modules to the floor 128.

Both the livestock carrying modules 102 and sustenance modules 107 must have sufficient strength to support superposed modules, to carry access modules attached thereto, and in the case of livestock carrying modules to support the animals in the livestock space. The water and feed outlets in the livestock carrying modules will conveniently be on the end walls thereof, and the connection between the services in the access modules 108 and the adjacent livestock carrying modules may be any known means such as flexible couplings, or by opposed faces coming into sealing engagement when the two modules are rigidly attached to one another. Similar couplings between adjacent access modules may also be provided.

The access modules 108 comprise generally platforms which carry the services, as shown, within their framework, or alternatively, the services may be slung below the platform. The framework should be sufficiently strong and rigid to support livestock and/or attendants thereon when the access modules are rigidly mounted between opposed livestock carrying modules and sustenance modules as shown in FIGS. 10 and 11. Conveniently the depth of the framework is substantially equal to the depth of the sewage spaces 127 of the livestock carrying modules. The necessary diameter duct may then be provided within the framework of the access module for sewage extraction, and air supply and extraction.

The structure in accordance with the second aspect of the present invention provides a means for transporting livestock in which minimum permanent interference with the transporter takes place. In the present embodiment, penetrations in the decks for the pipework are required, and the supports for carrying the modules may be permanently fitted. Furthermore, because of the ventilation system and sewage extracting system, injurious effects to the transporter, caused by the acidic content of the sewage, should be minimised. The structure and services may be adapted to comply with statutory regulations and laws of countries which the ship visits, and it is envisaged that the structure may be adapted within the present invention to be suitable for use as a land transport system, or in a modified dimensional form, in aircraft for transporting, for example, zoological specimens. Additionally, the structure may be used as a stationary livestock storage area, as a winter store, lairage or for intensive farming. The modules will preferably be built to international dimensional standards.

Further the structure may be totally self-sufficient for a period of up to several days since it includes facilities for catering for food and water on demand, and for the automatic evacuation of sewage into the sewage tank. The structure may also include electrical lighting, as at 120 in FIG. 11, an electrical connection being made directly to the livestock carrying modules 102 or by way of the access modules 108.

What we claim is:

1. A structure for housing livestock such as cattle or sheep, comprising a plurality of livestock carrying modules located in two spaced, opposed, and longitudinally extending rows, a space for livestock in each livestock carrying module and a space for livestock sewage below the livestock space and capable of communicating therewith, said sewage space being integrally formed with the livestock carrying module, access module means rigidly secured to the opposed rows of modules and means permitting ingress to and egress from the livestock space of each livestock carrying module for the livestock and attendants and which opens on to the access module means, service duct means carried by each access module means and in communication with respective livestock carrying modules for the removal of sewage from the sewage spaces thereof, the service duct means of longitudinally adjacent access module means being in sealing engagement to provide a continuous service channel, means for drawing sewage through the duct means from the sewage spaces, and feed supply means for livestock in the livestock spaces.

2. A structure for housing livestock according to claim 1 in which a store for livestock feed is provided at one end of the livestock space within each livestock carrying module, said feed store being accessible to livestock attendants from the access module means.

3. A structure for housing livestock according to claim 2 wherein a water store is provided in each livestock carrying module.

4. A structure for housing livestock according to claim 1 wherein a sustenance module is located between two longitudinally adjacent livestock carrying modules in each row and is intended to contain feed for manual or automatic supply to the feed supply means of the said two livestock carrying modules.

5. A structure for housing livestock according to claim 4 wherein a livestock drinking water outlet is provided in each livestock space, each water outlet being supplied with drinking water from a reservoir by way of a ducted water supply carried by the access module means.

6. A structure for housing livestock according to claim 1 in which a ducted ventilation service, supplying air to an outlet in an adjacent livestock space, is carried by the access module means.

7. A structure for housing livestock according to claim 6 in which an air extraction duct is carried by the access module means and communicates with each livestock space, suction means being connected to said duct for drawing foul air from the livestock carrying modules.

8. A structure for housing livestock according to claim 7 wherein the sewage extraction means is powered by a source independent of the air suction means whereby in the event of a power failure in the ventilation system, the air extraction duct may be selectively connected to the sewage extraction means to evacuate foul air from each livestock space.

9. A structure for housing livestock according to claim 1 wherein a service duct is carried by the access module means for the supply of water for use in washing out the livestock spaces and opens into the livestock spaces, the said water exiting from the livestock spaces by way of respective sewage spaces.

10. A structure for housing livestock according to claim 1 wherein at least two arrays of livestock carrying modules and access module means are provided in superposed manner, livestock carrying modules in the or a lower array supporting those in an upper array, and ramp means being provided between upper and lower access module means.

* * * * *